United States Patent
Sato et al.

(10) Patent No.: US 10,497,985 B2
(45) Date of Patent: Dec. 3, 2019

(54) ELECTRODE PLATE FOR POWER STORAGE DEVICES AND POWER STORAGE DEVICE

(71) Applicant: Sanyo Electric Co., Ltd., Daito-shi, Osaka (JP)

(72) Inventors: Eisuke Sato, Osaka (JP); Motoki Kinugawa, Kyoto (JP); Naoyuki Koide, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 43 days.

(21) Appl. No.: 15/768,771

(22) PCT Filed: Oct. 27, 2016

(86) PCT No.: PCT/JP2016/004719
§ 371 (c)(1),
(2) Date: Apr. 16, 2018

(87) PCT Pub. No.: WO2017/077698
PCT Pub. Date: May 11, 2017

(65) Prior Publication Data
US 2018/0287213 A1    Oct. 4, 2018

(30) Foreign Application Priority Data

Nov. 6, 2015   (JP) ................................. 2015-218302

(51) Int. Cl.
*H01M 4/02* (2006.01)
*H01M 10/0587* (2010.01)
(Continued)

(52) U.S. Cl.
CPC ........ *H01M 10/0587* (2013.01); *H01G 11/26* (2013.01); *H01G 11/74* (2013.01);
(Continued)

(58) Field of Classification Search
CPC .......... H01M 2/02; H01M 2/26; H01M 2/263; H01M 4/134; H01M 4/38; H01M 10/0587;
(Continued)

(56) References Cited

U.S. PATENT DOCUMENTS

| | | | | |
|---|---|---|---|---|
| 8,758,928 B2* | 6/2014 | Wu | ......................... | H01M 2/26 429/161 |
| 9,142,854 B2* | 9/2015 | Lee | ..................... | H01M 2/1673 |
| 2013/0255074 A1* | 10/2013 | Uchida | ............... | H01M 4/0404 29/623.5 |

FOREIGN PATENT DOCUMENTS

| | | |
|---|---|---|
| JP | 3-187155 A | 8/1991 |
| JP | 7-14570 A | 1/1995 |

(Continued)

OTHER PUBLICATIONS

International Search Report dated Jan. 31, 2017, issued in counterpart International Application No. PCT/JP2016/004719 (2 pages).

*Primary Examiner* — Raymond Alejandro
(74) *Attorney, Agent, or Firm* — Westerman, Hattori, Daniels & Adrian, LLP

(57) ABSTRACT

An electrode plate for power storage devices having a high capacity and a power storage device including the electrode plate for power storage devices, an exemplary embodiment includes a strip-shaped positive electrode core and a positive electrode active material layer provided on at least one surface of the positive electrode core. A bare part is formed in an end portion of the positive electrode core in the width direction. The bare part is a part in which the surface of the core is exposed and to which a positive electrode lead is to be connected. The positive electrode active material layer has a thin part in at least part of a first region aligned with the bare part in the longitudinal direction of the positive (Continued)

electrode core. The thin part is thinner than a second region, which is a region other than the first region.

10 Claims, 5 Drawing Sheets

(51) Int. Cl.
    *H01G 11/26*     (2013.01)
    *H01M 2/26*     (2006.01)
    *H01M 2/02*     (2006.01)
    *H01M 4/134*     (2010.01)
    *H01M 4/38*     (2006.01)
    *H01G 11/74*     (2013.01)
    *H01M 10/04*     (2006.01)

(52) U.S. Cl.
    CPC ............... *H01M 2/02* (2013.01); *H01M 2/26* (2013.01); *H01M 2/263* (2013.01); *H01M 4/134* (2013.01); *H01M 4/38* (2013.01); *H01M 10/0422* (2013.01); *H01M 2004/027* (2013.01); *H01M 2004/028* (2013.01)

(58) Field of Classification Search
    CPC ....... H01M 10/0422; H01M 2004/027; H01M 2004/028; H01G 11/26; H01G 11/74
    See application file for complete search history.

(56) References Cited

FOREIGN PATENT DOCUMENTS

| | | |
|---|---|---|
| JP | 10-241725 A | 9/1998 |
| JP | 2000-268813 A | 9/2000 |
| JP | 2001-6664 A | 1/2001 |
| JP | 2003-68271 A | 3/2003 |

* cited by examiner

ELECTRODE PLATE FOR POWER STORAGE DEVICES AND POWER STORAGE DEVICE

TECHNICAL FIELD

The present disclosure relates to an electrode plate for power storage devices and a power storage device.

BACKGROUND ART

There is a need to improve electrode plates in order to increase the energy density of power storage devices. For example, Patent Literature 1 and Patent Literature 2 each disclose an electrode plate including a bare part formed in part of a core in the width direction (an end portion in the width direction) in order to increase the capacity of a non-aqueous electrolyte secondary battery. The bare part is a part in which the surface of the core is exposed and to which an electrode plate lead is to be connected. Since the active material layer of such an electrode plate has a larger area than the active material layer of an electrode plate having a bare part formed over the full width of a core, such an electrode plate increases the capacity of a battery. The width direction of the electrode plate corresponds to the axial direction of a wound-type electrode body, and the longitudinal direction corresponds to the winding direction of the electrode body.

CITATION LIST

Patent Literature

PTL 1: Japanese Published Unexamined Patent Application No. 2001-6664
PTL 2: Japanese Published Unexamined Patent Application No. 2003-68271

SUMMARY OF INVENTION

Technical Problem

When a bare part is formed in an end portion of a core in the width direction, a lead will be unevenly connected to the end portion in the width direction of the core. A lead is typically thicker than an active material layer. In a wound-type electrode body including the electrode plate disclosed in Patent Literature 1 or 2, an end portion of the electrode body in the axial direction thus protrudes locally due to the influence of the thickness of the lead connected to the end portion of the core in the width direction. Because of this configuration, the use of such an electrode plate makes it difficult to stably form a winding structure on the winding outer side with respect to a lead connection part and tends to cause winding misalignment in the electrode body.

Solution to Problem

An electrode plate for power storage devices in an aspect of the present disclosure is an electrode plate for power storage devices that is used to form a wound-type electrode body. The electrode plate for power storage devices includes a strip-shaped core, and an active material layer provided on at least one surface of the core. A bare part is formed in an end portion of the core in the width direction and at a position distant from a first end portion of the core in the longitudinal direction. The bare part is a part in which the surface of the core is exposed and to which a lead is to be connected. The first end portion is located on the winding outer side of the electrode body. The active material layer includes a thin part in at least part of a first region aligned with the bare part in the longitudinal direction of the core. The thin part is thinner than a second region, which is a region other than the first region.

A power storage device in an aspect of the present disclosure includes the electrode plate for power storage devices as at least one of a positive electrode plate and a negative electrode plate.

Advantageous Effects of Invention

According to the electrode plate for power storage devices of the present disclosure, the winding misalignment of the electrode body can be minimized sufficiently even when a lead is connected to a bare part formed in an end portion of a core in the width direction.

DESCRIPTION OF EMBODIMENTS

Figure 1:
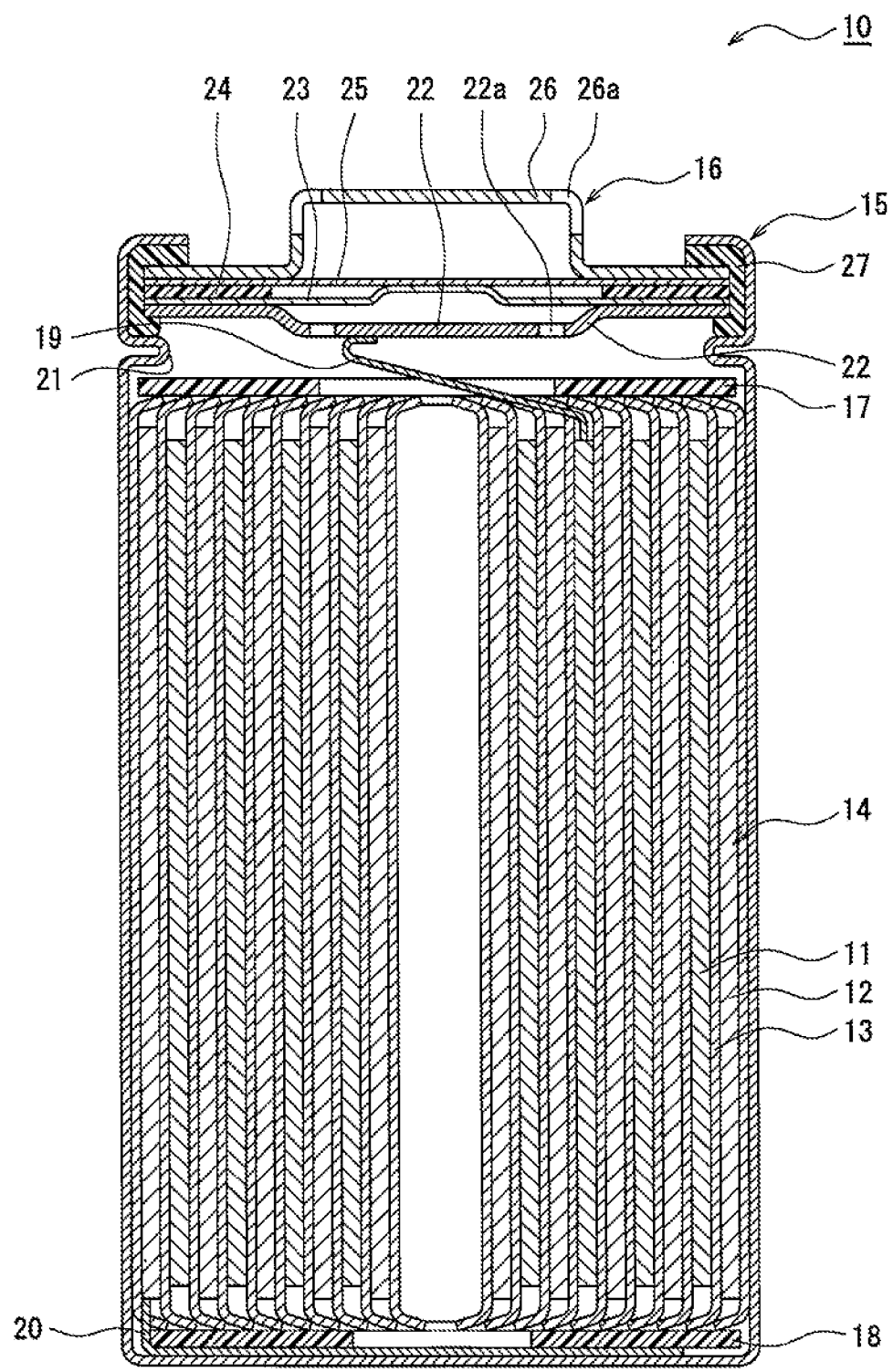
FIG. 1 is a sectional view of a non-aqueous electrolyte secondary battery in one exemplary embodiment.

In an electrode plate for power storage devices of the present disclosure, a bare part in which the surface of the core is exposed and which serves as a part to which a lead is to be connected is formed in part of a core in the width direction (an end portion in the width direction) in order to increase the area of an active material layer as large as possible and thus to increase the energy density of a power storage device. When a lead is connected to the full width of the core, winding misalignment is unlikely to occur because a wound-type electrode boy protrudes over the substantially full length in the axial direction α (see FIG. 2). However, when a lead is connected to an end portion of the core in the width direction, an end portion of the electrode body in the axial direction locally protrudes, and winding misalignment tends to occur on the winding outer side with respect to the lead. Specifically, the electrode plate that forms a winding structure shifts in the axial direction α, and the end portion of the electrode body in the axial direction waves, and it is thus difficult to adjust the entire end portion at the same level in the axial direction.

The inventors of the present invention have diligently carried out studies to solve the aforementioned problems and, as a result, found out a new electrode-plate structure in which the first region, which is a region of the active material layer aligned with the bare part in the longitudinal direction of the core that corresponds to the winding direction γ (see FIG. 2) of the electrode body, has a thin part having a small thickness. According to the electrode plate of the present disclosure, the thin part formed in the first region absorbs a difference in thickness between the lead and the active material layer (second region) and minimizes winding misalignment of the electrode body. Since the first region of the active material layer overlaps the bare part in the radial direction β (see FIG. 2) in a wound-type electrode body, that is, in the stacking direction of the electrode body, the bare part being a part to which a lead is connected, the influence of the thickness of the lead can be reduced by making the first region thinner than the second region.

The effect of minimizing winding misalignment is also obtained even when the thin part is formed in a narrow area. Preferably, the thin part is formed on the winding outer side with respect to the bare part or in substantially all parts of the first region.

Hereinafter, exemplary embodiments will be described in detail.

The drawings to which reference is made in the description of the embodiments are schematically illustrated. The dimensional ratios and the like of components in the drawings may be different from actual dimensional ratios and the like. Specific dimensional ratios and the like should be determined in light of the following description. As used therein, the term "substantially" is intended to describe substantially the same feature as an example and include completely the same feature and substantially the same feature. The term "end portion" refers to an end of an object and surroundings of the end. The term "central portion" refers to the center of an object and surroundings of the center.

In exemplary embodiments, a cylindrical battery having a cylindrical metal case (non-aqueous electrolyte secondary battery 10) and a battery electrode plate (positive electrode plate 11) included in the battery are illustrated. A power storage device and an electrode plate for power storage devices according to the present disclosure are not limited to these. The power storage device of the present disclosure may be, for example, a prismatic battery having a prismatic metal case or may be a laminate-type battery having an outer body formed of a resin sheet. Alternatively, the power storage device according to the present disclosure may be a capacitor, and the electrode plate for power storage devices according to the present disclosure may be used as a capacitor electrode plate.

Figure 2:
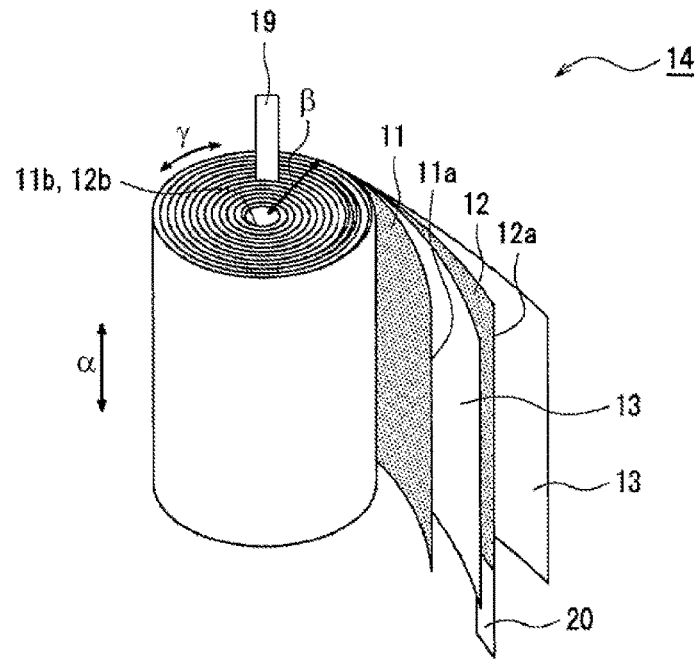
FIG. 2 is a perspective view of a wound-type electrode body in one exemplary embodiment.

Referring to FIG. 1 to FIG. 9, the non-aqueous electrolyte secondary battery 10 according to an exemplary embodiment and electrode plates included in the battery will be described below in detail. FIG. 1 is a sectional view of the non-aqueous electrolyte secondary battery 10. FIG. 2 is a perspective view of an electrode body 14 included in the non-aqueous electrolyte secondary battery 10.

As illustrated in FIG. 1 and FIG. 2, the non-aqueous electrolyte secondary battery 10 includes a positive electrode plate 11, a negative electrode plate 12, and a non-aqueous electrolyte (not shown). The positive electrode plate 11 and the negative electrode plate 12 together with a separator 13 form the electrode body 14. The non-aqueous electrolyte contains a non-aqueous solvent and an electrolyte salt dissolved in the non-aqueous solvent. The non-aqueous electrolyte is not limited to a liquid electrolyte and may be a solid electrolyte containing a gel polymer or the like. In the example illustrated in FIG. 1, a case body 15 having a bottomed cylindrical shape and a sealing body 16 form a metal battery case for accommodating the electrode body 14 and the non-aqueous electrolyte.

The non-aqueous electrolyte secondary battery 10 preferably includes insulating plates 17 and 18, which are disposed above and below the electrode body 14, respectively. In the example illustrated in FIG. 1, a positive electrode lead 19 attached to the positive electrode plate 11 passes through a through-hole of the insulating plate 17 and extends toward the sealing body 16, whereas a negative electrode lead 20 attached to the negative electrode plate 12 passes outside the insulating plate 18 and extends toward the bottom of the case body 15. The positive electrode lead 19 is welded to the lower surface of a filter 22, which is a bottom plate of the sealing body 16. A cap 26 is a top plate of the sealing body 16 and is electrically connected to the filter 22. The cap 26 serves as a positive electrode terminal. The negative electrode lead 20 is welded to the bottom inner surface of the case body 15. The case body 15 serves as a negative electrode terminal.

The electrode body 14 is a wound-type electrode body formed by spirally winding the positive electrode plate 11 and the negative electrode plate 12 with the separator 13 interposed therebetween. The positive electrode plate 11, the negative electrode plate 12, and the separator 13 each have a strip shape and are spirally wound so that the positive electrode plate 11, the negative electrode plate 12, and the separator 13 are alternately stacked on top of one another in the radial direction β of the electrode body 14. In the electrode body 14, the longitudinal direction of each electrode plate corresponds to the winding direction γ, and the width direction of each electrode plate corresponds to the axial direction α. The separator 13 is formed of an insulating porous sheet (microporous membrane) having ion permeability. Suitable examples of the separator 13 include a polyethylene microporous membrane. The thickness of the separator 13 is, for example, 10 μm to 50 μm. The positive electrode plate 11 and the negative electrode plate 12 will be described below in detail.

The electrode body 14 includes a positive electrode lead 19 and a negative electrode lead 20 in addition to the positive electrode plate 11, the negative electrode plate 12, and the separator 13. Each lead is attached to the core of the corresponding electrode (see, for example, FIG. 5 described below). In the example illustrated in FIG. 2, the positive electrode lead 19 is attached to a central portion in the longitudinal direction distant, from a winding outer side-end portion 11a of the positive electrode plate 11. The positive electrode lead 19 is sandwiched between a stack of the positive electrode plate 11, the negative electrode plate 12, and the separator 13 and a stack of the positive electrode plate 11, the negative electrode plate 12, and the separator 13 from both sides in the radial direction β of the electrode body 14. The negative electrode lead 20 is attached to a winding outer-side end portion 12a of the negative electrode plate 12. The positive electrode lead 19 extends from a first end portion of the electrode body 14 in the axial direction α. The negative electrode lead 20 extends from a second end portion of the electrode body 14 in the axial direction α. The thickness of the positive electrode lead 19 is preferably 150 μm to 500 μm in view of, for example, the current collecting performance of the positive electrode plate 11, the durability (prevention from fracture) of the lead, and downsizing of the electrode body 14. In general, the positive electrode lead 19 is thicker than the positive electrode active material layer (see FIG. 6 described below).

One lead is attached to each electrode in this embodiment, but a plurality of leads may be attached to each electrode. The positions at which the leads are attached to the corresponding electrodes are not limited to the positions illustrated in FIG. 2. For example, the positive electrode lead 19 may be attached to the winding inner side-end portion 11b in addition to the central portion of the positive electrode plate 11 in the longitudinal direction or instead of the central portion. The negative electrode lead 20 may be attached to the winding inner side-end portion 12b in addition to the winding outer side-end portion 12a or instead of the winding outer side-end portion 12a.

The case body 15 is a metal container having a bottomed cylindrical shape. A gasket 27 is interposed between the case body 15 and the sealing body 16 to ensure sealing of the battery case. The case body 15 has, for example, a protrusion 21 which is formed by pressing the side surface from outside and which supports the sealing body 16. The protrusion 21 is preferably annularly formed in the circumferential direction of the case body 15 and supports the sealing body 16 on its upper surface.

The sealing body 16 includes a filter 22 having a filter opening 22a, valve bodies (a lower valve body 23, an upper valve body 25), an insulating member 24, and a cap 26 having a cap opening 26a. The valve bodies close the filter opening 22a and fracture when heat generation caused by an internal short circuit or the like increases the internal pressure of the battery. The members that constitute the sealing body 16 have, for example, a disc shape or ring shape. The members other than the insulating member 24 are electrically connected to one another. The lower valve body 23 and the upper valve body 25 are connected to each other at their center portions, and the insulating member 24 is interposed between the peripheral portions of the lower valve body 23 and the upper valve body 25. When heat generation caused by an internal short circuit or the like increases the internal pressure, for example, the lower valve body 23 fractures. This causes the upper valve body 25 to curve toward the cap 26 and come apart from the lower valve body 23, which breaks the electrical connection between the lower valve body 23 and the upper valve body 25.

Referring to FIG. 3 to FIG. 7, the electrode body 14, particularly the positive electrode plate 11 and the structure associated with the positive electrode plate 11 will be specifically described.

Figure 3:
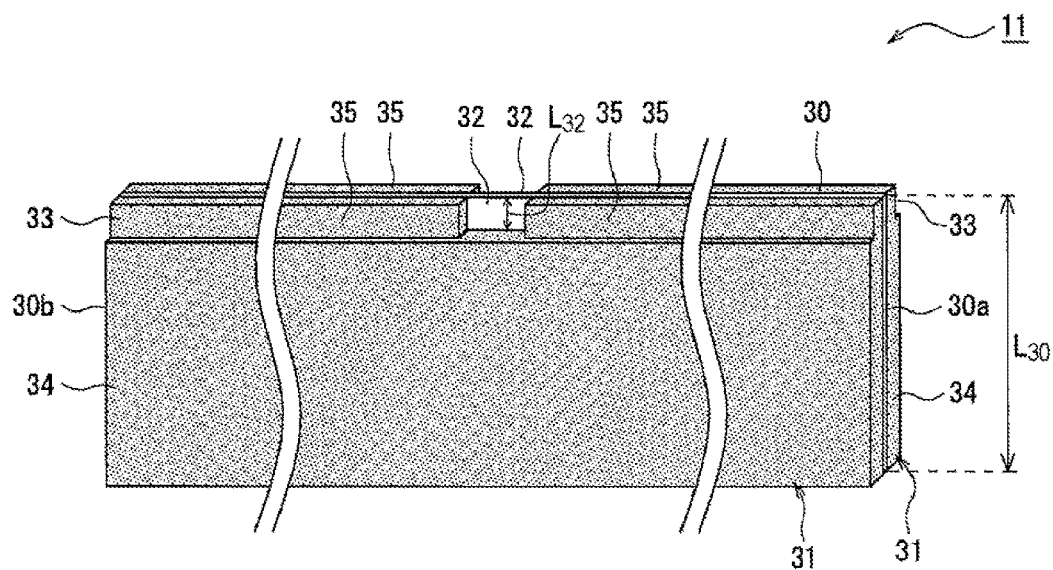
FIG. 3 is a perspective view of a positive electrode plate in one exemplary embodiment.
Figure 4:
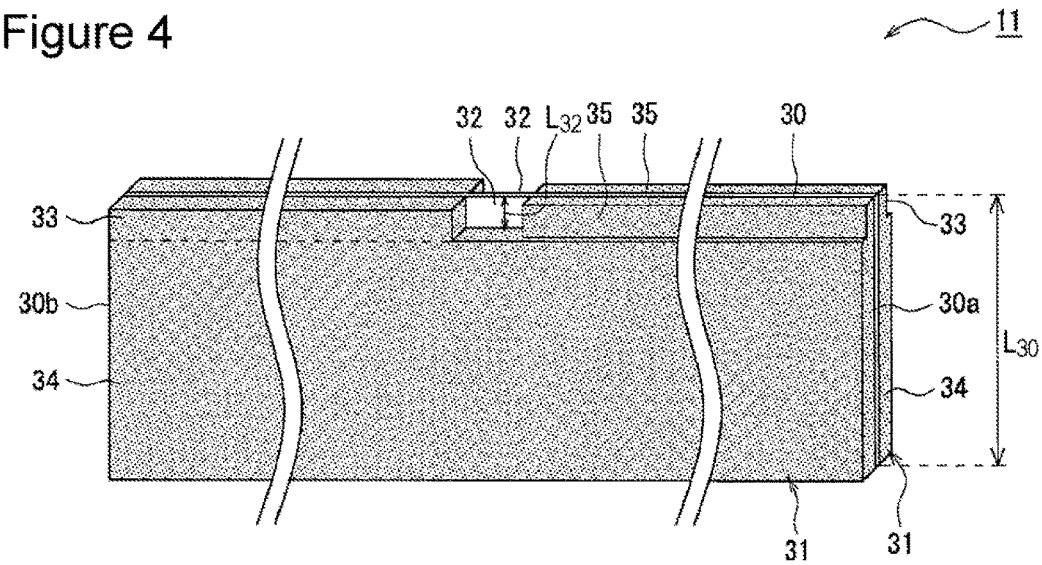
FIG. 4 is a perspective view of a positive electrode plate in another exemplary embodiment.
Figure 5:
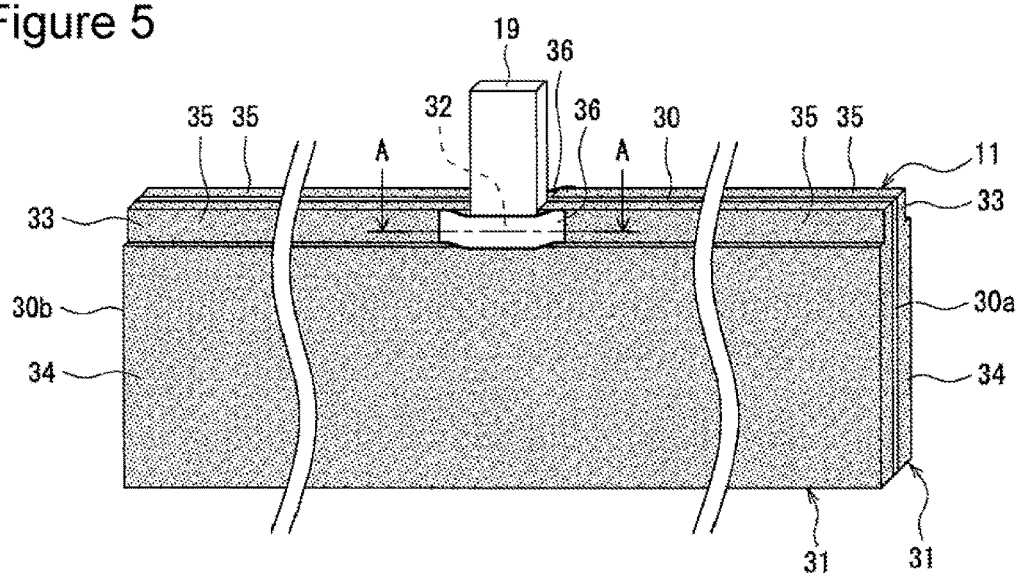
FIG. 5 is a perspective view of the positive electrode plate of FIG. 3 to which a positive electrode lead is attached.
Figure 6:
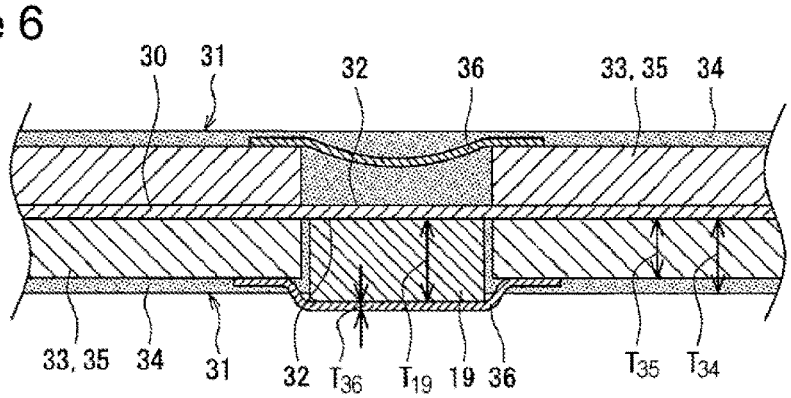
FIG. 6 is a sectional view taken along line A-A in FIG. 5.

FIG. 3 and FIG. 4 are perspective views of the positive electrode plate 11. FIG. 5 is a view of the positive electrode plate 11 of FIG. 3 to which the positive electrode lead 19 is attached. FIG. 6 is a sectional view taken along line A-A in FIG. 5. FIG. 3 to FIG. 6 illustrate the straightened positive electrode plate 11. The right side of each figure corresponds to the winding outer side (winding end side) of the electrode body 14, and the left side of each figure corresponds to the winding inner side (winding start side). As described above, the longitudinal direction of the positive electrode plate 11 corresponds to the winding direction γ of the electrode body 14, and the width direction of the positive electrode plate 11 corresponds to the axial direction α of the electrode body 14. A first end portion 30a of a positive electrode core 30 in the longitudinal direction is located on the winding outer side of the electrode body 14. A second end portion 30b in the longitudinal direction is located on the winding inner side of the electrode body 14.

The positive electrode plate 11 includes a strip-shaped positive electrode core 30 and a positive electrode active material layer 31 provided on at least one surface of the positive electrode core 30. In this embodiment, the positive electrode active material layer 31 is provided on each surface of the positive electrode core 30. The size of the positive electrode core 30 depends on, for example, the size of the battery, and the positive electrode core 30 is typically 300 mm to 800 mm long and 30 mm to 80 mm wide. The positive electrode core 30 is, for example, a foil made of a metal, such as aluminum, or a film having the surface layer made of the metal. The positive electrode core 30 is preferably a metal foil containing aluminum or an aluminum alloy as a main component. The thickness of the positive electrode core 30 is, for example, 10 μm to 30 μm.

The positive electrode active material layer 31 is preferably provided in substantially all parts of each surface of the positive electrode core 30 except for a bare part 32 described below. The positive electrode active material layer 31 preferably contains a positive electrode active material, a conductive material, and a binding material. As described below in detail, the positive electrode plate 11 can be produced by applying, to each surface of the positive electrode core 30, a positive electrode mixture slurry containing a positive electrode active material, a conductive material, a binding material, and a solvent, such as N-methyl-2-pyrrolidone (NMP) and pressing each coating film.

Examples of the positive electrode active material include lithium-containing composite oxides containing transition metal elements, such as Co, Mn, and Ni. The lithium-containing composite oxide is preferably, but not necessarily, a composite oxide represented by general formula $Li_{1+x}MO_2$ (where $-0.2<x\leq0.2$, $-0.1\leq b \leq0.1$, and M includes at least one of Ni, Co, Mn, and Al). Suitable examples of the composite oxide include Ni—Co—Mn-based lithium-containing composite oxides, and Ni—Co—Al-based lithium-containing composite oxides.

The conductive material is used to increase the electrical conductivity of the positive electrode active material layer 31. Examples of the conductive material include carbon materials, such as carbon black (CB), acetylene black (AB), Ketjenblack, and graphite. These conductive materials may be used alone or in combination of two or more.

The binding material is used to maintain good conditions of contact between the positive electrode active material and the conductive material and to increase the strength of bonding of the positive electrode active material or the like to the surface of the positive electrode core 30. Examples of the binding material include fluorocarbon resins, such as polytetrafluoroethylene (PTFE) and polyvinylidene fluoride (PVdF), polyacrylonitrile (PAN), polyimide resins, acrylic resins, and polyolefin resins. These resins may be used together with, for example, carboxymethyl cellulose (CMC) or a salt thereof, or polyethylene oxide (PEO). These binding materials may be used alone or in combination of two or more.

As illustrated in FIG. 3 and FIG. 4, the bare part 32 in which the surface of the core is exposed is formed in an end portion of the positive electrode core 30 in the width direction. The bare part 32 is a part to which the positive electrode lead 19 is to be connected and in which there is no positive electrode active material layer 31 and the surface of the core is not covered with the positive electrode active material layer 31. The formation of the bare part 32 allows the positive electrode lead 19 to be directly connected to the positive electrode core 30. The bare part 32 is formed to have a length of $L_{32}$ in the width direction of the positive electrode core 30 from an end of the positive electrode core 30 in the width direction. Hereinafter, the direction of the bare part 32 along the longitudinal direction of the positive electrode core 30 may be referred to as a transverse direction, and the direction of the bare part 32 along the width direction of the positive electrode core 30 may be referred to as a vertical direction for convenience of description.

The length $L_{32}$ of the bare part 32 in the vertical direction is preferably ½ or less of the width $L_{30}$ of the positive electrode core 30, more preferably ⅓ or less of $L_{30}$ in order to increase the area of the positive electrode active material layer 31 as large as possible and thus increase the capacity of the battery. The length $L_{32}$ of the bare part 32 is still more preferably ⅓ to 1/10 of $L_{30}$ in view of, for example, high capacity, the attachability of the positive electrode lead 19, and the current collecting performance of the positive electrode plate 11. The length of the bare part 32 in the transverse direction is preferably similar to the width of the positive electrode lead 19 without hindering the attachment of the positive electrode lead 19 to the bare part 32 and is, for example, slightly longer than the width of the positive electrode lead 19.

The bare part 32 may be formed by removing part of the positive electrode active material layer 31 after forming the positive electrode active material layer 31 in all parts of each surface of the positive electrode core 30. As described below, the bare part 32 is preferably formed by application of no positive electrode mixture slurry to part of the positive electrode core 30. For example, intermittent application of the positive electrode mixture slurry to form the bare part 32 can eliminate the process for removing the active material layer and can reduce material costs.

A plurality of the bare parts 32 may be formed on one surface of the positive electrode core 30, but one bare part 32 is formed on one surface of the positive electrode core 30 in this embodiment. When a plurality of the positive electrode leads 19 is attached, the bare parts 32 as many as the leads are formed. The positive electrode active material layer 31 is provided on each surface of the positive electrode core 30 as described above, and one bare part 32 is also formed in each surface of the positive electrode core 30 in this embodiment. Since the positive electrode lead 19 is typically connected to one surface of the positive electrode core 30 by welding or the like, the bare part 32 may be formed on only one surface of the positive electrode core 30 even when the positive electrode active material layer 31 is provided on each surface of the positive electrode core 30. However, the active material layer located on the surface opposite to the surface having the bare part 32 may inhibit, for example, connection of the positive electrode lead 19 to the bare part 32. Thus, the bare part 32 is preferably formed on each surface of the positive electrode core 30 such that the bare parts 32 overlap each other in the thickness direction or the positive electrode core 30.

The bare part 32 is formed at a position distant from the first end portion 30a of the positive electrode core 30 in the longitudinal direction. The first end portion 30a corresponds to the winding outer side-end portion 11a of the positive electrode plate 11 in the electrode body 14. The bare part 32 may be formed in each end portion of the positive electrode core 30 in the longitudinal direction, and preferably formed in a central portion of the positive electrode core 30 in the longitudinal direction in view of the current collecting performance of the positive electrode plate 11. In other words, the bare part 32 is preferably formed at a position that is located at a substantially equal distance from the first end portion 30a in the longitudinal direction and the second end portion 30b in the longitudinal direction. In this case, the positive electrode active material layer 31 is provided on each surface of the bare part 32 in the transverse direction.

The positive electrode active material layer 31 includes a thin part 35 in at least part of a first region 33 aligned with the bare part 32 in the longitudinal direction of the positive electrode core 30. The thin part 35 is thinner than a second region 34, which is a region other than the first region 33. In other words, the positive electrode active material layer 31 has two regions having a different thickness. The second region 34 may locally include a thin part having a small thickness as long as the average thickness of the thin part 35 is smaller than the average thickness of the second region 34 and, preferably, the maximum thickness of the thin part 35 is smaller than the minimum thickness of the second region 34. When the thin part 35 is formed in the first region 33, the thin part 35 absorbs a difference between the thickness of the positive electrode lead 19 and the thickness of the second region 34 and minimizes winding misalignment in the electrode body 14.

Here, the first region 33 of the positive electrode active material layer 31 refers to a region that is aligned with the bare part 32 in the longitudinal direction of the positive electrode core 30 (positive electrode plate 11) and that overlaps the bare part 32 in the longitudinal direction of the positive electrode core 30. In this specification, a region that even slightly overlaps the bare part 32 in the longitudinal direction of the positive electrode core 30 is defined as the first region 33. The second region 34 of the positive electrode active material layer 31 is a region that is out of alignment with the bare part 32 in the longitudinal direction of the positive electrode core 30 and that does not overlap the bare part 32 in the longitudinal direction. The thickness of the positive electrode active material layer 31 can be measured using a contact thickness gauge. The average thickness of the positive electrode active material layer 31 is calculated from the measurement values obtained by measuring the thickness at any ten points in a target region to be measured.

The thickness of the positive electrode active material layer 31 is preferably substantially uniform in the second region 34, which is a region other than the first region 33. The second region 34 is preferably as thick as possible in view of high capacity or other factors. The average thickness of the second region 34 is preferably, but not necessarily limited, 50 μm to 150 μm, more preferably 60 μm to 140 μm, and still more preferably 70 μm to 130 μm.

As the thickness of the positive electrode active material layer 31 increases, it is more difficult to stretch the electrode plate and it is easier to fracture the electrode plate. Therefore, the average thickness of the second region 34 is preferably 150 μm or less as described above and is typically smaller than the thickness of the positive electrode lead 19. The second regions 34 each provided on each surface of the positive electrode core 30 preferably have substantially the same thickness, and the total thickness of the second regions 34 is, for example, 100 μm to 300 μm.

The average thickness of the thin part 35 is preferably 0.80 to 0.99 times, and more preferably 0.85 to 0.37 times the average thickness of the second region 34. When the thickness ratio between the thin part 35 and the second region 34 is within this range, the winding misalignment of the electrode body 14 can be minimized efficiently while a decrease in the capacity of the battery is suppressed. In general, as the region (area) in which the thin part 35 is formed is smaller, the thin part 35 is preferably thinner and a suitable thickness ratio between the thin part 35 and the second region 34 is larger.

The mass per unit area of the thin part 35 is preferably smaller than the mass per unit area of the second region 34. For example, the density of the thin part 35 is substantially the same as the density of the second region 34, and the density of the positive electrode active material layer 31 is substantially uniform in all parts including the thin part 35.

In this embodiment, the coating amount of the positive electrode mixture slurry is different in the first region 33 and the second region 34, and each coating film is pressed in the same conditions. The coating amount of the slurry in a region of the positive electrode core 30 corresponding to the first region 33 is smaller than that in a region corresponding to the second region 34. In this case, the thickness of the first region 33 can be made smaller than the thickness of the second region 34 while the density of each region is substantially the same. The reason why a difference in thickness is generated between the regions when the coating films are pressed using a uniform roll may be that the amount of spring back of the coating film after pressing differs depending on the coating amount of the slurry. In other words, the amount of spring back in the first region 33 is smaller than that in the second region 34 even when the coating films are pressed into the same thickness.

It is also possible to cause the first region 33 and the second region 34 to have a different thickness by changing the conditions for pressing the coating film in each region while the coating amount of the positive electrode mixture slurry is the same in the first region 33 and the second region 34. For example, it is possible to press the second region 34 more gently than to press the first region 33. In this case, the mass per unit area of each region becomes substantially the same, and the density of the second region 34 becomes smaller than the density of the first region 33. Since the density is preferably increased by strongly pressing the positive electrode active material layer 31 in view of the energy density of the battery, it is preferred to change the coating amount of the positive electrode mixture slurry as described above and press each coating film in the same conditions.

The thin part 35 may be formed only in the first region 33 on one surface of the positive electrode core 30 to which the positive electrode lead 19 is to be attached. The thin part 35, however, is preferably formed in each first region 33 on each surface of the positive electrode core 30. The thin parts 35 each formed on each surface of the positive electrode core 30 preferably overlap each other in the thickness direction of the positive electrode core 30. The formation of the thin part 35 on each surface of the positive electrode core 30 makes it easy to absorb a difference between the thickness of the positive electrode lead 19 and the thickness of the second region 34.

In the example illustrated in FIG. 3, the thin part 35 is formed in substantially ail parts of the first region 33, and substantially all parts of the first region 33 are thinner than the second region 34. The thickness of the thin part 35 is substantially uniform in all parts of the first region 33. The positive electrode active material layer 31 has the thin part 35 in an end portion of the positive electrode core 30 in the width direction. The thin part 35 is formed in the longitudinal direction of the positive electrode core 30 so as to have a strip shape in plan view. A step is formed in the longitudinal direction of the positive electrode plate 11 and at the position of the boundary between the first region 33 (thin part 35) and the second region 34. The thickness of the thin part 35 may change in the longitudinal direction of the positive electrode core 30. For example, the thin part 35 becomes thinner gradually or stepwise at a distance closer to the bare part 32 from at least one of the first end portion 30a of the positive electrode core 30 in the longitudinal direction and the second end portion 30b of the positive electrode core 30 in the longitudinal direction.

In the example illustrated in FIG. 3, the thin part 35 is formed in substantially all parts of the first region 33 of each positive electrode active material layer 31 provided on each surface of the positive electrode core 30. In other words, the area of the thin part 35 is maximum in the form illustrated to FIG. 3. In this case, the average thickness of the thin part 35 is preferably 0.90 to 0.99 times and more preferably 0.93 to 0.97 times the average thickness of the second region 34.

In the example illustrated in FIG. 4, a thin part 35 is formed only on the winding outer side of the first region 33 with respect to the bare part 32. The thin part 35 is formed in substantially all parts of the first region 33 (hereinafter may be referred to as a "winding outer-side first region") located on the winding outer side with respect to the bare part 32. On the winding inner side with respect to the bare part 32, the thickness of the first region 33 is substantially the same as the thickness of the second region 34. The thickness of the thin part 35 is substantially uniform in all parts of the winding outer-side first region, and a step is formed in the longitudinal direction of the positive electrode plate 11 and at the position of the boundary between the thin part 35 and the second region 34. As in the form illustrated in FIG. 3, the thickness of the thin part 35 may change in the longitudinal direction of the positive electrode core 30.

In the example illustrated in FIG. 4, the thin part 35 is formed in substantially all parts of the winding outer-side first region in the first region 33 of each positive electrode active material layer 31 provided on each surface of the positive electrode core 30. In this case, the area of the thin part 35 is ½ of the area of the first region 33. Since the absorption of the thickness of the positive electrode lead 19 is most efficiently carried out by the thin part 35 formed in the winding outer-side first region, the form illustrated to FIG. 4 is preferred in order to increase the capacity and minimize winding misalignment. In this case, the average thickness of the thin part 35 is preferably 0.85 to 0.97 times and more preferably 0.90 to 0.95 times the average thickness of the second region 34.

The thin part 35 is preferably formed at a position such that the thin part 35 overlaps the positive electrode lead 19 (bare part 32) in the radial direction β of the electrode body 14, and more preferably formed at a position such that the thin part 35 overlaps itself in the radial direction β on the winding outer side with respect to the positive electrode lead 19. The thin part 35 may be formed, for example, in the range of substantially a half of the winding outer-side first region (e.g., a range from the bare part 32 to a middle point between the bare part 32 and the first end portion 30a in the longitudinal direction) or in the range of substantially a half of the first region with the bare part 32 located in the range. The thin part 35 can also be selectively formed only at a position such that the thin part 35 overlaps the positive electrode lead 19 in the radial direction β of the electrode body 14.

As illustrated in FIG. 5, the positive electrode lead 19 is connected to one of the bare parts 32 each formed on each surface of the positive electrode core 30. The positive electrode lead 19 is attached to the bare part 32 by, for example, welding. An insulating tape 36 for covering the positive electrode lead 19 is preferably attached to the positive electrode plate 11 to which the positive electrode lead 19 has been welded. The insulating tape 36 is attached to a part of the positive electrode lead 19 that opposes the negative electrode plate 12. In the example illustrated in FIG. 5, the insulating tape 36 is attached to cover a part of the positive electrode lead 19 connected to the bare part 32 and portions of the thin part 35 located on both sides of the bare part 32 in the transverse direction.

The insulating tape 36 is an adhesive tape in which an adhesive layer is formed on one surface of a resin film and which has high electrolyte solution resistance. The insulating tape 36 covers the positive electrode lead 19 and the bare part 32 and prevents generation of a row-resistance internal short circuit involving the flow of a large current upon contact between the negative electrode plate 12 and the positive electrode lead 19 or the positive electrode core 30 when the separator 13 fractures. To prevent such an internal short circuit, the insulating tape 36 is preferably attached to cover the bare part 32 to which the positive electrode lead 19 is not attached.

As illustrated in FIG. 6, the thickness $T_{19}$ of the positive electrode lead 19 is larger than the thickness of the positive electrode active material layer 31 (the thickness $T_{34}$ of the second region 34). When the thickness $T_{19}$ is smaller than the thickness $T_{34}$ and the sum $(T_{19}+T_{36})$ of the thickness $T_{19}$ and the thickness $T_{36}$ of the insulating tape 36 is larger than the thickness $T_{34}$, the electrode body 14 tends to undergo winding misalignment. However, when the thickness $T_{19}$ is larger than the thickness $T_{34}$, an issue of winding misalignment becomes more significant. It is difficult to make the thickness $T_{19}$ of the positive electrode lead 19 smaller than the thickness of the positive electrode active material layer 31 in view of the current collecting performance of the positive electrode plate 11 and in order to, for example, suppress a fracture of the lead and suppress a fracture of the positive electrode plate 11 caused by an increased thickness of the positive electrode active material layer 31. In other words, it is difficult to form the positive electrode active material layer 31 so as to have a thickness larger than the thickness $T_{19}$ of the positive electrode lead 19.

The thickness $T_{36}$ of the insulating tape 36 is preferably small in order to minimize winding misalignment as long as the insulating tape 36 maintains a function of preventing a short circuit. In the example illustrated in FIG. 6, the sum $(T_{35}+T_{36})$ of the thickness $T_{35}$ of the thin part 35 and the thickness $T_{36}$ of the insulating tape 36 is smaller than the thickness $T_{34}$ of the second region 34 $(T_{35}+T_{36}<T_{34})$. The insulating tape 36 is attached to cover portions of the thin part 35 located on both sides of the bare part 32 in the transverse direction. When $T_{35}+T_{36}<T_{34}$, the portions of the thin part 35 to which the insulating tape 36 has been attached do not protrude further than the second region 34, and it easy to reduce the influence of the thickness of the insulating tape 36.

Figure 7:
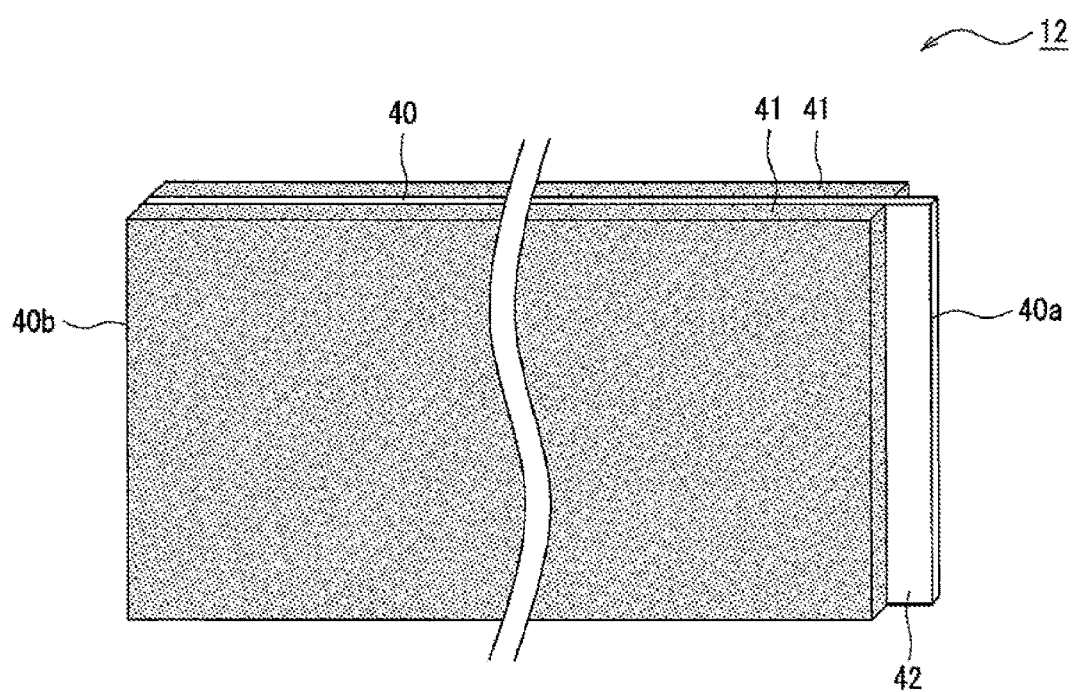
FIG. 7 is a perspective view of a negative electrode plate in one exemplary embodiment.

As illustrated in FIG. 7, the negative electrode plate 12 includes a strip-shaped negative electrode core 40 and a negative electrode active material layer 41 provided on at least one surface of the negative electrode core 40. The size of the negative electrode core 40 depends on the size of the battery or the like, and the negative electrode core 40 is typically 350 mm to 900 mm long and 35 mm to 90 mm wide. The negative electrode core 40 is, for example, a foil made of a metal, such as copper, or a film having the surface layer made of the metal. The thickness of the negative electrode core 40 is, for example, 10 μm to 30 μm. The negative electrode active material layer 41 is preferably provided in substantially all parts of each surface of the negative electrode core 40 except for a bare part 42 described below. The negative electrode active material layer 41 preferably contains a negative electrode active material and a binding material. The negative electrode plate 12 is produced, for example, by applying, to each surface of the negative electrode core 40, a negative electrode mixture slurry containing a negative electrode active material, a binding material, and water and pressing each coating film.

The negative electrode active material is any active material that can reversibly intercalate and deintercalate lithium ions. Examples of the negative electrode active material include carbon materials, such as natural graphite and artificial graphite, metals, such as Si and Sn, to be alloyed, with lithium, alloys and oxides containing metal elements, such as Si and Sn. These materials way be used alone or in a mixture of two or more. Examples of the binding material in the negative electrode active material layer 41 include fluorocarbon resins, PAN, polyimide resins, acrylic resins, and polyolefin resins, which are the same as those for the positive electrode plate 11. When the negative electrode mixture slurry is prepared by using an aqueous solvent, styrene-butadiene rubber (SBR), CMC or a salt thereof, polyacrylic acid (PAA) or a salt thereof, polyvinyl alcohol (PVA), or the like can be used.

In the example illustrated in FIG. 7, a bare part 42 is located in the first end portion 40a of the negative electrode core 40 in the longitudinal direction that corresponds to the winding outer side-end portion 12a of the negative electrode plate 12 in the electrode body 14 and formed over the full width of the negative electrode core 40. The bare part 42 is a part in which the surface of the core is exposed and to which a negative electrode lead 20 is to be connected. The negative electrode active material layer 41 is formed on each surface of the negative electrode core 40 except for the bare part 42 so as to have a substantially uniform thickness. The position at which the bare part 42 is formed or the like is not limited to the position or the like illustrated in FIG. 7. The bare part 42 may be formed in a second end portion 40b of the negative electrode core 40 in the longitudinal direction or may be formed in a central portion of the negative electrode core 40 in the longitudinal direction. When the bare part 42 is formed in part of the negative electrode core 40 in the width direction so as to be distant from a first end portion 40a in the longitudinal direction, a thin part, that is thinner than other regions is preferably formed in a first region of the negative electrode active material layer 41 aligned with the bare part 42 in the longitudinal direction of the negative electrode core 40, as in the positive electrode plate 11.

Figure 8:
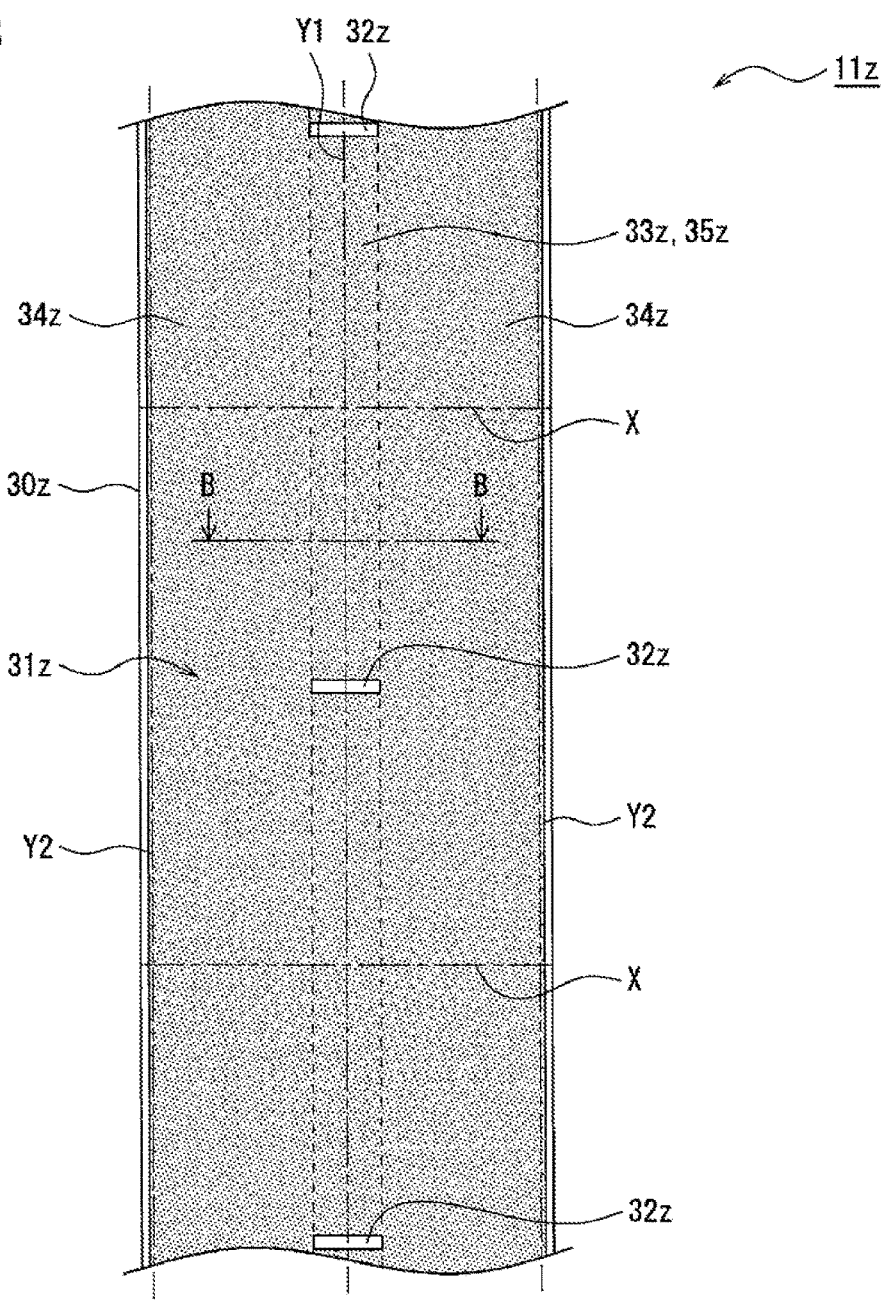
FIG. 8 is a view for describing a method for producing a positive electrode plate in one exemplary embodiment.
Figure 9:
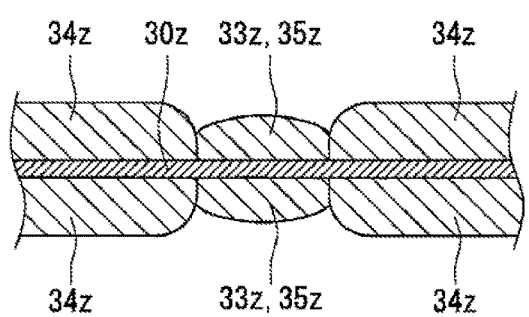
FIG. 9 is a sectional view taken along line B-B in FIG. 8.

Referring to FIG. 8 and FIG. 9, an example method for producing the positive electrode plate 11 will be described below in detail. FIG. 8 is a plan view illustrating a long body 11z of the positive electrode plate (hereinafter referred to simply as a "long body 11z"). FIG. 9 is a sectional view taken along line B-B in FIG. 8. The long body 11z is a long body that is to be divided into a plurality of positive electrode plates 11 when cut along intended cut lines X, Y1, and Y2. The parts of the long body 11z that correspond to the positive electrode active material layer 31, the bare part 32, the first region 33, and the second region 34 of the positive electrode plate 11 obtained when the long body 11z is cut along the intended cut lines are respectively defined as a positive electrode active material layer 31z, a bare part 32z, a first region 33z, and a second region 34z.

As illustrated in FIG. 8 and FIG. 9, the long body 11z has the positive electrode active material layer 31z (the first region 33z and the second region 34z) on each surface of a long body 30z of a positive electrode core (hereinafter referred to simply as a "long body 30z"). The positive electrode active material layer 31z is formed by applying a positive electrode mixture slurry to the long body 30z and pressing the coating film. The positive electrode mixture slurry contains a positive electrode active material, a conductive material, a binding material, a solvent, and the like as described above. The coating film formed by application of the positive electrode mixture slurry is subjected to, for example, heat drying and then pressed with a roll to form the positive electrode active material layer 31z. The negative electrode plate 12 can be produced in the same manner as for the positive electrode plate 11 except that the negative electrode mixture slurry is used instead of the positive electrode mixture slurry and that no thin part 35 is formed.

The bare part 32z in which the surface of the long body 30z is exposed is preferably formed by intermittent application of the positive electrode mixture slurry such that no positive electrode mixture slurry is applied to parts of the long body 30z in the longitudinal direction during the formation of the positive electrode active material layer 31z. In other words, the bare part 32z is formed as a non-coated part without coating of the positive electrode mixture slurry. In the example illustrated in FIG. 8, the bare parts 32z are located in a central portion of the long body 30z in the width direction and formed at substantially regular intervals in the longitudinal direction of the long body 30z. The long body 30z includes two positive electrode cores 30 in the width direction. The bare part 32z is formed as bare parts of two positive electrode plates 11 so as to have an area that is twice the area of the bare part 32.

The bare part 32z is, for example, symmetric with respect to the center (intended cut line Y1) of the long body 30z in the width direction. The first region 33z of the positive electrode active material layer 31z aligned with the bare part 32z in the longitudinal direction of the long body 30z is also symmetric with respect to the center in the width direction. On each side of the first region 33z in the width direction, the positive electrode mixture slurry is continuously applied onto the long body 30z. to form the second region 34z of the positive electrode active material layer 31z.

In the example illustrated in FIG. 8, the long body 11z including the positive electrode active material layer 31z on each surface of the long body 30z is cut along the intended cut line Y1 at the center in the width direction, and unnecessary edges of the long body 11z are cut along the intended cut lines Y2 to produce long bodies each having a width equivalent to the width of one positive electrode plate 11. The long bodies are then cut in the width direction along the intended cut lines X to produce positive electrode plates 11.

The positive electrode active material layer 31z has a plurality of strip-shaped regions (the first region 33z, the second region 34z) in the longitudinal direction of the long body 11z. The plurality of strip-shaped regions each has a different thickness. The first region 33z is thicker than the second region 34z. The first region 33z and the second region 34z can be formed by using a slurry coater having a plurality of application members from which the positive electrode mixture slurry is applied independently. An example application member is a nozzle having a discharge port. The slurry coater has, for example, a valve with which on/off of slurry application in each application site, the slurry coating amount, and the like can be controlled independently.

The first region 33z is formed by, for example, intermittent application of the positive electrode mixture slurry from an application member (hereinafter referred to as a "first application member") disposed above in a central portion of the long body 30z in the width direction. The bare part 32z is formed when the application of the slurry is terminated. The first region 33z and the bare part 32z can be alternately formed at substantially regular intervals by repeating on and off of slurry application at regular intervals. The second region 34z is formed by, for example, continuous application of the slurry from an application member (hereinafter referred to as a "second application member") disposed adjacent to the first application member from which the slurry for forming the first region 33z is applied. In general, the application of the slurry onto the long body 30z is carried out while the long body 30z is continuously conveyed in the longitudinal direction with the positions of the application members fixed.

In the process for applying the positive electrode mixture slurry, the slurry coating amount from the first application member is smaller than the slurry coating amount from the second application member. The slurry coating amount from the first application member is adjusted to, for example, 0.80 to 0.99 times the slurry coating amount from the second application member. The conditions for pressing the coating film are the same in both regions. Due to this process, the first region 33z becomes thinner than the second region 34z, and the thin part 35z is formed in the first region 33z. In addition, the density of the thin part 35z becomes substantially equal to the density of the second region 34z.

The slurry coating amount from the first application member may be set at a constant value or varied in continuous application. When the slurry coating amount is set at a constant value, the thin part 35z can be formed in substantially all parts of the first region 33z. When the slurry coating amount is varied, for example, the thin part 35z can be formed only on the winding outer side of the positive electrode plate 11 with respect to the bare part 32, and the thickness of the thin part 35z can be changed. The slurry coating amount from the second application member is preferably set at a constant value.

The first application member and the second application member are disposed above the long body 30z that is continuously conveyed in the longitudinal direction and are out of alignment with each other in the width direction of the long body 30z such that these members do not interfere with each other. In other words, one of the first application member and the second application member is disposed upstream in the conveyance direction of the long body 30z, and the other is disposed downstream in the conveyance direction.

The discharge port of the first application member and the discharge port of the second application member do not overlap each other in the longitudinal direction (conveyance direction) of the long body 30z, and the application members may be disposed such that the end portions of the discharge ports are aligned with each other in the longitudinal direction. Alternatively, the application members may be disposed such that parts of the discharge ports overlap each other in the longitudinal direction of the long body 30z, that is, parts of the discharge ports are aligned with each other in the longitudinal direction. Since the slurry coating amount tends to decrease at the end portion of the discharge port, the layer thickness may be significantly reduced at the position of the boundary between the first region 33z and the second region 34z in the former arrangement. According to the latter arrangement, it is easy to minimize such a reduction in layer thickness by controlling the degree of overlap of the discharge ports in a suitable range.

According to the non-aqueous electrolyte secondary battery 10 having the above-described configuration, the thin part 35 formed in the first region 33 of the positive electrode active material layer 31 can absorb a difference between the thickness of the positive electrode lead 19 and the insulating tape 36 and the thickness of the second region 34. Since the capacity of the battery is increased by increasing the area of the positive electrode active material layer 31 as large as possible, the winding misalignment of the electrode body 14 can be minimized sufficiently even when the positive electrode lead 19 is connected to the bare part 32 formed in part of the positive electrode core 30 in the width direction.

Table 1 indicates an example effect of minimizing winding misalignment in the non-aqueous electrolyte secondary battery 10 (Example). In Table 1, the case where the first region of the positive electrode active material layer has no thin part is described as a comparison. The wound-type electrode bodies of Example and Comparative Example are produced in the same conditions using the same positive electrode plate, the same negative electrode plate, the same separator, and the same electrode plate lead, except for the presence or absence of the thin part. The winding misalignment is evaluated by determining the meandering amount of the positive and negative electrode plates that run during winding. When the meandering amount of the positive electrode plate and the negative electrode plate is within 0.6 mm, it assumed that there is no winding misalignment. When the meandering amount of at least one of the positive electrode plate and the negative electrode plate exceeds 0.6 mm, it assumed that there is winding misalignment. As indicated in Table 1, the winding misalignment can be minimized by forming the thin part.

TABLE 1

| | Presence or absence of thin part | Presence or absence of winding misalignment |
| --- | --- | --- |
| Example | present (formed in all parts of first region) | absent |
| Comparative Example | absent (positive electrode active material layer has uniform thickness) | present |

The details of Example and Comparative Example are as described below. The evaluation of winding misalignment was carried out for 20 electrode bodies in each of Example and Comparative Example. The thickness of the positive electrode active material layer is a mean of the values obtained by measuring the thickness of 10 positive electrode plates out of 20 electrode bodies.

(1) Positive Electrode Plate
  Positive electrode core: aluminum foil, 661 mm long, 58 mm wide, 0.15 mm thick
  Bare part: formed in an end portion of the positive electrode core in the width direction and in a central portion of the positive electrode core in the longitudinal direction.
  Positive electrode active material layer: including a lithium-nickel composite oxide, acetylene black, and polyvinylidene fluoride and formed on each surface of the positive electrode core.
  Average thickness of first region (thin part) of positive electrode active material layer: 130 μm
  Average thickness of second region of positive electrode active material layer: 140 μm
(The positive electrode active material layer of Comparative Example is formed to have the same thickness as the second region)
  Ratio of thickness of first region to thickness of second region (first region/second region): 0.96
(2) Negative Electrode Plate
  Negative electrode core: copper foil, 720 long, 53 mm wide, 0.1 mm thick
  Bare part: formed over the full width of the negative electrode core in a first end portion (winding outer side-end portion) of the negative electrode core in the longitudinal direction.
  Negative electrode active material layer: including graphite, styrene-butadiene rubber, and carboxymethyl cellulose and formed on each surface of the negative electrode core.
  Average thickness of negative electrode active material layer: 160 μm
(3) Separator: polyethylene microporous membrane 16 μm thick
(4) Positive electrode lead: 3 mm wide, 0.15 mm thick
(5) Negative electrode lead: 3 mm wide, 0.15 mm thick
(6) Electrode body: (diameter 18 mm) produced by winding the positive electrode plate in which the positive electrode lead has been welded to the bare part of the positive electrode core, and the negative electrode plate in which the negative electrode lead has been welded to the bare part of the negative electrode core, with the separator interposed between the positive electrode plate and the negative electrode plate.

REFERENCE SIGNS LIST

10 Non-aqueous electrolyte secondary battery, 11 Positive electrode plate, 11a Winding outer side-end portion, 11b Winding inner side-end portion, 11z Long body of positive electrode plate, 12 Negative electrode plate, 12a Winding outer side-end portion, 12b Winding inner side-end portion, 13 Separator, 14 Electrode body, 15 Case body, 16 Sealing body, 17, 18 Insulating plate, 19 Positive electrode lead, 20 Negative electrode lead, 21 Protrusion, 22 Filter, 22a Filter opening, 23 Lower valve body, 24 Insulating member, 25 Upper valve body, 26 Cap, 26a Cap opening, 27 Gasket, 30 Positive electrode core, 30a First end portion in longitudinal direction, 30b Second end portion in longitudinal direction, 30z Long body of positive electrode core, 31, 31z Positive electrode active material layer, 32, 32z Bare part, 33, 33z First region, 34, 34z Second region, 35, 35z Thin part, 36 Insulating tape, 40 Negative electrode core, 40a First end portion in longitudinal direction, 40b Second end portion in longitudinal direction, 41 Negative electrode active material layer, 42 Bare part.

The invention claimed is:

1. An electrode plate for power storage devices that is used to forma wound-type electrode body, the electrode plate comprising:
  a strip-shaped core; and
  an active material layer provided on at least one surface of the core,
    wherein a bare part is formed in an end portion of the core in a width direction and at a position distant from a first end portion of the core in a longitudinal direction, the bare part being a part in which a surface of the core is exposed and to which a lead is to be connected, the first end portion being located on a winding outer side of the electrode body,
    wherein the active material layer includes a thin part in at least part of a first region aligned with the bare part in the longitudinal direction of the core, the thin part being thinner than a second region, which is a region other than the first region.

2. The electrode plate for power storage devices according to claim 1, Wherein the thin part in the first region of the active material layer is formed at least on the winding outer side with respect to the bare part.

3. The electrode plate for power storage devices according to claim 2, wherein the thin part is formed in substantially all parts of the first region.

4. The electrode plate for power storage devices according to claim 1, wherein an average thickness of the thin part is 0.80 to 0.99 times an average thickness of the second region.

5. The electrode plate for power storage devices according to claim 1, wherein a mass per unit area of the thin part is smaller than a mass per unit area of the second region.

6. The electrode plate for power storage devices according to claim 1, wherein the bare part is formed in a central portion of the core in the longitudinal direction.

7. A power storage device comprising the electrode plate for power storage devices according to claim 1 as at least one of a positive electrode plate and a negative electrode plate.

8. A power storage device comprising:
a positive electrode plate formed of the electrode plate for power storage devices according to claim 1;
the lead bonded to the bare part of positive electrode plate; and
a negative electrode plate,
wherein the lead is thicker than the active material layer.

9. A power storage device comprising:
a positive electrode plate formed of the electrode plate for power storage devices according to claim 1;
the lead bonded to the bare part of the positive electrode plate;
an insulating tape attached to cover the lead; and
a negative electrode plate,
wherein a thickness of the lead or a total thickness of the lead and the insulating tape is larger than a thickness of the active material layer.

10. The power storage device according to claim 9, wherein a total thickness of the thin part and the insulating tape is smaller than a thickness of the second region.

* * * * *